United States Patent
Gomes et al.

(10) Patent No.: US 10,723,272 B2
(45) Date of Patent: Jul. 28, 2020

(54) STEP RAIL SYSTEM FOR VEHICLE

(71) Applicant: JAC Products, Inc., Saline, MI (US)

(72) Inventors: Gerald J. Gomes, Macomb, MI (US); Michael J. Presley, Plymouth, MI (US); Brendan J. Hathaway, Washington, MI (US); Darrick A. Swords, Berkley, MI (US)

(73) Assignee: JAC Products, Inc., Saline, MI (US)

(*) Notice: Subject to any disclaimer, the term of this patent is extended or adjusted under 35 U.S.C. 154(b) by 0 days.

(21) Appl. No.: 16/209,199

(22) Filed: Dec. 4, 2018

(65) Prior Publication Data
US 2019/0168674 A1    Jun. 6, 2019

Related U.S. Application Data

(60) Provisional application No. 62/594,218, filed on Dec. 4, 2017.

(51) Int. Cl.
*B60R 3/00* (2006.01)

(52) U.S. Cl.
CPC .................... *B60R 3/002* (2013.01)

(58) Field of Classification Search
CPC ...................................... B60R 3/002
See application file for complete search history.

(56) References Cited

U.S. PATENT DOCUMENTS

| | | |
|---|---|---|
| 1,310,973 A | 7/1919 | Schrenk |
| 1,584,573 A * | 5/1926 | Stonehill ............. B60R 3/002 280/169 |
| 4,004,695 A | 1/1977 | Hockensmith et al. |
| 4,021,055 A | 5/1977 | Okland |
| 4,057,942 A | 11/1977 | Kranefeld et al. |
| 4,094,230 A | 6/1978 | Wright et al. |
| 4,167,272 A | 9/1979 | Wright et al. |
| 4,240,521 A | 12/1980 | Naka |
| 4,253,256 A | 3/1981 | Feliz |
| 4,309,854 A | 1/1982 | Vendramini |
| 4,318,488 A | 3/1982 | Rathi |
| 4,403,421 A | 9/1983 | Shepherd |
| 4,406,375 A | 9/1983 | Hockensmith |
| 4,424,828 A | 1/1984 | Zellinger et al. |
| 4,498,263 A | 2/1985 | Bocker |
| 4,568,808 A | 2/1986 | Thuries et al. |
| 4,584,776 A | 4/1986 | Shepherd |
| 4,589,076 A | 5/1986 | Fujioka |
| 4,646,794 A | 3/1987 | Padarev et al. |
| 4,660,731 A | 4/1987 | Becker |
| 4,674,261 A | 6/1987 | Sabel |

(Continued)

FOREIGN PATENT DOCUMENTS

JP    H08175270 A    7/1996

*Primary Examiner* — Brian L Swenson
(74) *Attorney, Agent, or Firm* — Harness, Dickey & Pierce, P.L.C.

(57) ABSTRACT

The present disclosure relates to a step rail system supportable from a structure of a motor vehicle. The system may have an inner step rail element and an outermost step rail element. The inner step rail element may be arranged nestably within the outmost step rail element. The inner and outermost step rail elements may further be arranged at least partially within the same plane. The outermost step rail element may have at least one of a curved leading portion or a curved trailing portion.

17 Claims, 6 Drawing Sheets

(56) References Cited

U.S. PATENT DOCUMENTS

| | | |
|---|---|---|
| 4,699,281 A | 10/1987 | Kishi |
| 4,733,598 A | 3/1988 | Innes et al. |
| 4,793,437 A | 12/1988 | Hanthorn |
| 4,809,472 A | 3/1989 | Hade, Jr. et al. |
| 4,932,176 A | 6/1990 | Roberts et al. |
| 4,944,656 A | 7/1990 | Feng et al. |
| 4,944,711 A | 7/1990 | Hironaka et al. |
| 5,110,250 A | 5/1992 | Kuo |
| 5,135,074 A | 8/1992 | Hornagold |
| 5,148,717 A | 9/1992 | Yamaguchi |
| 5,191,828 A | 3/1993 | McCreery |
| 5,226,853 A | 7/1993 | Courgeon |
| 5,238,287 A | 8/1993 | Haddad, Jr. |
| 5,259,664 A | 11/1993 | Cottle |
| 5,286,049 A | 2/1994 | Khan |
| 5,423,650 A | 6/1995 | Zerbst et al. |
| 5,489,114 A | 2/1996 | Ward et al. |
| 5,513,825 A | 5/1996 | Gutgsell |
| 5,584,645 A | 12/1996 | Kaspar |
| 5,632,395 A | 5/1997 | Zimmermann |
| 5,669,562 A | 9/1997 | Smith |
| 5,718,345 A | 2/1998 | Hade, Jr. |
| 5,731,987 A | 3/1998 | Strong et al. |
| 5,813,552 A | 9/1998 | Kaspar |
| 5,877,693 A | 3/1999 | Eyler |
| 5,926,961 A | 7/1999 | Uhl |
| 5,930,934 A | 8/1999 | Fisher et al. |
| 5,938,395 A | 8/1999 | Dumont, Jr. |
| 6,050,579 A | 4/2000 | Selland et al. |
| 6,062,404 A | 5/2000 | Erdmann |
| 6,176,672 B1 | 1/2001 | Egan et al. |
| 6,185,875 B1 | 2/2001 | Victor et al. |
| 6,186,347 B1 | 2/2001 | Reifenscheid et al. |
| 6,199,325 B1 | 3/2001 | Winship |
| 6,199,707 B1 | 3/2001 | Suzuki et al. |
| 6,267,398 B1 | 7/2001 | Lombard |
| 6,280,086 B1 | 8/2001 | Stijns |
| 6,305,820 B1 | 10/2001 | Poon |
| 6,520,523 B2 | 2/2003 | Beck |
| 6,575,318 B2 | 6/2003 | Stowasser et al. |
| 6,588,783 B2 | 7/2003 | Fichter |
| 6,592,135 B2 | 7/2003 | Hendrix |
| 6,641,355 B1 | 11/2003 | McInerney et al. |
| 6,641,358 B2 | 11/2003 | Schmidt, V et al. |
| 6,830,257 B2 | 12/2004 | Leitner |
| 6,874,801 B2 | 4/2005 | Fichter |
| 6,938,909 B2 | 9/2005 | Leitner |
| 6,942,233 B2 | 9/2005 | Leitner et al. |
| 6,942,427 B1 | 9/2005 | Srinivasan |
| 6,955,370 B2 | 10/2005 | Fabiano et al. |
| 7,007,961 B2 | 3/2006 | Leitner et al. |
| D521,439 S | 5/2006 | Chapman et al. |
| 7,055,839 B2 | 6/2006 | Leitner |
| 7,083,179 B2 | 8/2006 | Chapman et al. |
| 7,118,120 B2 | 10/2006 | Lee et al. |
| 7,168,721 B2 | 1/2007 | Mulder |
| 7,182,175 B1 | 2/2007 | Schmitt et al. |
| 7,311,320 B2 | 12/2007 | Kuntze et al. |
| 7,318,596 B2 | 1/2008 | Scheuring, III et al. |
| 7,334,807 B2 | 2/2008 | Mulder et al. |
| 7,377,531 B2 | 5/2008 | Fabiano et al. |
| 7,380,807 B2 | 6/2008 | Leitner |
| 7,398,985 B2 | 7/2008 | Leitner et al. |
| 7,412,759 B1 | 8/2008 | Hsieh et al. |
| 7,413,204 B2 | 8/2008 | Leitner |
| 7,416,202 B2 | 8/2008 | Fichter |
| 7,488,025 B1 | 2/2009 | Roberson |
| 7,566,064 B2 | 7/2009 | Leitner et al. |
| 7,600,731 B2 | 10/2009 | Pasto |
| 7,621,546 B2 | 11/2009 | Ross et al. |
| 7,635,247 B2 | 12/2009 | Collins |
| 7,637,518 B2 | 12/2009 | Adair |
| 7,708,294 B2 | 5/2010 | Demick |
| 7,717,445 B2 | 5/2010 | Peterson et al. |
| 7,788,858 B1 | 9/2010 | Ammons |
| 7,827,641 B2 | 11/2010 | Hoffman et al. |
| 7,909,344 B1 | 3/2011 | Bundy |
| 7,909,520 B2 | 3/2011 | Barab |
| 8,002,298 B2 | 8/2011 | Casbolt et al. |
| 8,016,309 B2 | 9/2011 | Flajnik et al. |
| 8,136,826 B2 | 3/2012 | Watson |
| 8,156,266 B2 | 4/2012 | Agnihotri et al. |
| 8,182,470 B2 | 5/2012 | Devengenzo et al. |
| 8,276,326 B2 | 10/2012 | Lounis et al. |
| 8,322,580 B1 | 12/2012 | Hamilton |
| 8,448,968 B1 | 5/2013 | Grote et al. |
| 8,558,881 B2 | 10/2013 | Yu et al. |
| 8,590,951 B1 | 11/2013 | Calabro |
| 8,641,700 B2 | 2/2014 | Devengenzo et al. |
| 8,695,760 B2 | 4/2014 | Winter, IV |
| 8,707,495 B2 | 4/2014 | Romanak et al. |
| 8,714,575 B2 | 5/2014 | Watson |
| 8,777,074 B2 | 7/2014 | DeMers et al. |
| 8,844,957 B2 | 9/2014 | Leitner et al. |
| 8,893,905 B2 | 11/2014 | Stuhrwoldt |
| 9,161,526 B2 | 10/2015 | Nipper |
| 9,198,488 B2 | 12/2015 | Pronzati et al. |
| 9,221,401 B1 | 12/2015 | Birkenstock |
| 9,333,919 B2 | 5/2016 | Crandall et al. |
| 9,539,948 B1 | 1/2017 | Presley et al. |
| 9,855,877 B2 | 1/2018 | Aftanas et al. |
| 9,963,060 B1* | 5/2018 | Vick ................ B60P 1/435 |
| 2001/0018586 A1 | 8/2001 | Cosmescu |
| 2002/0056693 A1 | 5/2002 | Stowasser et al. |
| 2003/0006576 A1* | 1/2003 | Lanoue .............. B60R 3/002 |
| | | 280/163 |
| 2003/0127408 A1 | 7/2003 | Schneider |
| 2004/0256832 A1 | 12/2004 | Bradsen et al. |
| 2005/0005562 A1 | 1/2005 | Henderson et al. |
| 2005/0053465 A1 | 3/2005 | Roach et al. |
| 2005/0152749 A1 | 7/2005 | Anres et al. |
| 2005/0269159 A1 | 12/2005 | Lin |
| 2009/0044729 A1 | 2/2009 | Navarre et al. |
| 2009/0211174 A1 | 8/2009 | Henderson et al. |
| 2009/0218444 A1 | 9/2009 | Lahargou et al. |
| 2009/0269179 A1 | 10/2009 | Gale et al. |
| 2010/0160814 A1 | 6/2010 | Parihar |
| 2010/0307870 A1 | 12/2010 | Zimmerman |
| 2011/0036084 A1 | 2/2011 | Malian et al. |
| 2011/0225903 A1 | 9/2011 | Lounis et al. |
| 2012/0127300 A1 | 5/2012 | Yu et al. |
| 2012/0152880 A1 | 6/2012 | Stuhrwoldt |
| 2012/0193167 A1 | 8/2012 | Winter, IV |
| 2012/0209292 A1 | 8/2012 | Devengenzo et al. |
| 2013/0284010 A1 | 10/2013 | Allard et al. |
| 2013/0305627 A1 | 11/2013 | Pike et al. |
| 2014/0059949 A1 | 3/2014 | Lounis |
| 2014/0163581 A1 | 6/2014 | Devengenzo et al. |
| 2014/0264213 A1 | 9/2014 | Nipper |
| 2015/0008207 A1 | 1/2015 | Habe et al. |
| 2015/0091270 A1* | 4/2015 | Stanesic ............ H04N 19/436 |
| | | 280/163 |
| 2015/0113884 A1 | 4/2015 | Klingenberg |
| 2015/0135454 A1 | 5/2015 | Conway et al. |
| 2015/0144583 A1 | 5/2015 | Matsumoto |
| 2015/0211250 A1 | 7/2015 | Bach |
| 2016/0185273 A1 | 6/2016 | Aftanas et al. |
| 2017/0036596 A1* | 2/2017 | Yang ................ B60Q 1/323 |
| 2018/0043832 A1* | 2/2018 | Okuyama ............ B60R 3/02 |
| 2019/0054860 A1* | 2/2019 | Yang ................ B60R 3/002 |

* cited by examiner

STEP RAIL SYSTEM FOR VEHICLE

CROSS-REFERENCE TO RELATED APPLICATIONS

This application claims the benefit of U.S. Provisional Application No. 62/594,218, filed on Dec. 4, 2017. The entire disclosure of the above application is incorporated herein by reference.

FIELD

The present disclosure relates to step rails used on motor vehicles, and more particularly to a nested step rail system well adapted for use on motor vehicles such as cars, trucks, vans and other like vehicles.

BACKGROUND

The statements in this section merely provide background information related to the present disclosure and may not constitute prior art.

Step rails have become extremely popular in recent years, with the growing popularity of vehicles such as SUVs, vans and pickup trucks. Such vehicles, because they typically have greater ground clearance than other types of vehicles (e.g., sedans and station wagons) often require some form of step to assist the occupant in entering and exiting the vehicle comfortably. It is also understood that a step rail system must provide a step surface large enough to provide comfortable assistance to the user for ingress and egress to and from the vehicle, as well as providing improved access to load carrying areas of the vehicle, while safely supporting the mass of the user or users of the vehicle.

There is also growing interest in producing step rail systems which complement the look and styling of the vehicle they are used on, without compromising the load supporting capability of the step rail system. Further growing interest is in engineering step rails that can be made in a highly cost effective manner and which do not add significant unneeded weight to the vehicle, and which do not complicate the assembly/attachment of the step rail to the vehicle, and which are aerodynamically efficient.

SUMMARY

This section provides a general summary of the disclosure, and is not a comprehensive disclosure of its full scope or all of its features.

In one aspect the present disclosure relates to a step rail system supportable from a structure of a motor vehicle. The system may comprise an inner step rail element and an outermost step rail element. The inner step rail element may be arranged nestably within the outmost step rail element. The inner and outermost step rail elements may further be arranged at least partially within the same plane. The outermost step rail element may have at least one of a curved leading portion or a curved trailing portion.

In another aspect the present disclosure relates to a step rail system supportable from a structure of a motor vehicle. The system may comprise an inner step rail element and an outermost step rail element. The inner step rail element being shaped to be arranged nestably within the outermost step rail element, and the inner step rail element and the outermost step rail element being arranged at least partially within the same plane. The outermost step rail element further having at least one of a curved leading end portion or a curved trailing end portion.

Still another aspect of the present disclosure relates to a step rail system supportable from a structure of a motor vehicle. The system may comprise an inner step rail element, an intermediate step rail element, and an outermost step rail element. The inner step rail element and the intermediate step rail element may be arranged nestably within the outermost step rail element. The inner step rail element, the intermediate step rail element and the outermost step rail elements may further be arranged at least partially within the same plane. The outermost step rail element may have at least one of a curved leading end portion or a curved trailing end portion.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. Corresponding reference numerals indicate corresponding parts throughout the several views of the drawings.

DETAILED DESCRIPTION

Figure 1:
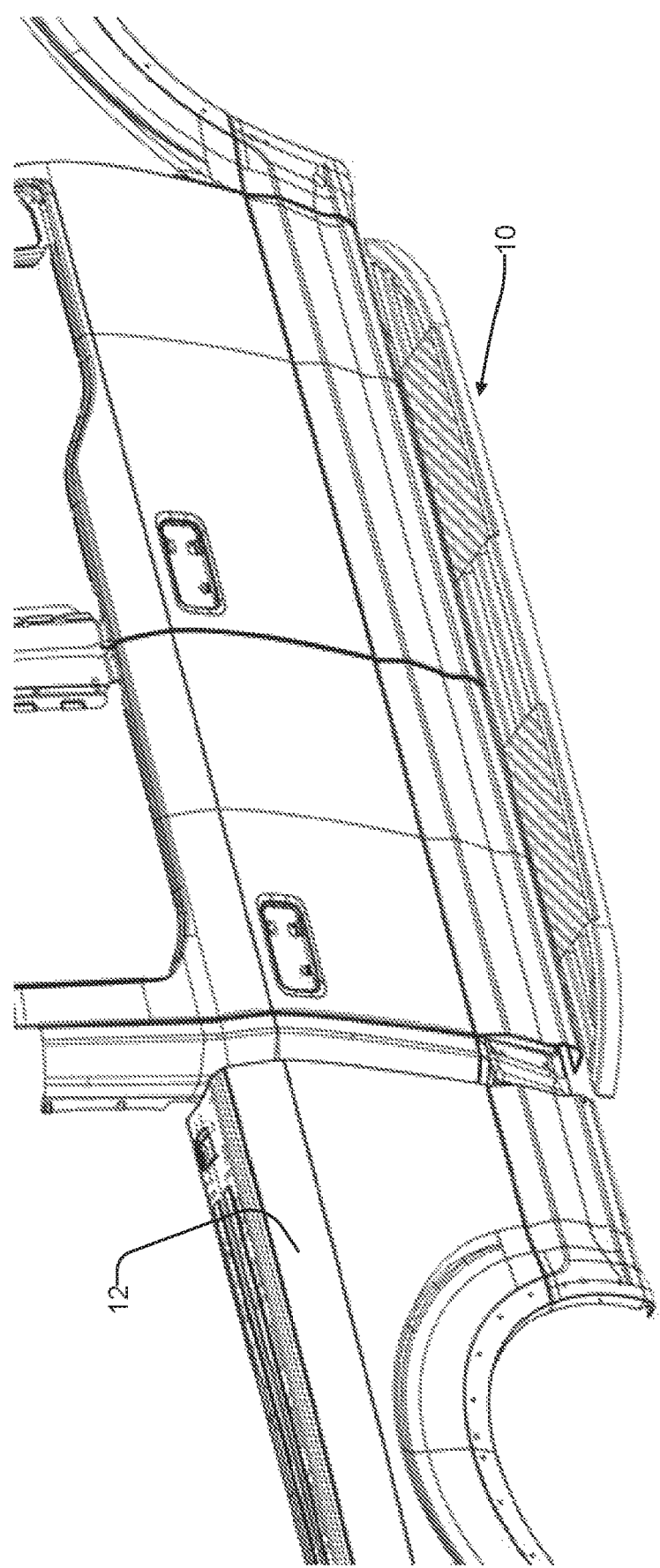
FIG. 1 is a perspective view of one embodiment of a vehicle step rail system in accordance with the present disclosure secured to the side of a motor vehicle, in this example a pickup truck.

The following description is merely exemplary in nature and is not intended to limit the present disclosure, application, or uses. It should be understood that throughout the drawings, corresponding reference numerals indicate like or corresponding parts and features.

Referring to FIG. 1 one embodiment of a step rail system 10 is shown secured to a structural portion of a vehicle 12. The vehicle 12 in this example is shown as a pickup truck, but it will be appreciated that the vehicle could be any form of vehicle such as a van, an SUV, etc. The step rail system 10 is not limited to use with only automotive vehicles, but may just as easily be used with ATVs and other types of vehicles. While FIG. 1 only illustrates one step rail system 10 being secured to one side of the vehicle 12, it will be appreciated that an additional step rail system 10 will be typically be secured to the opposite side of the vehicle as well.

Figure 2:
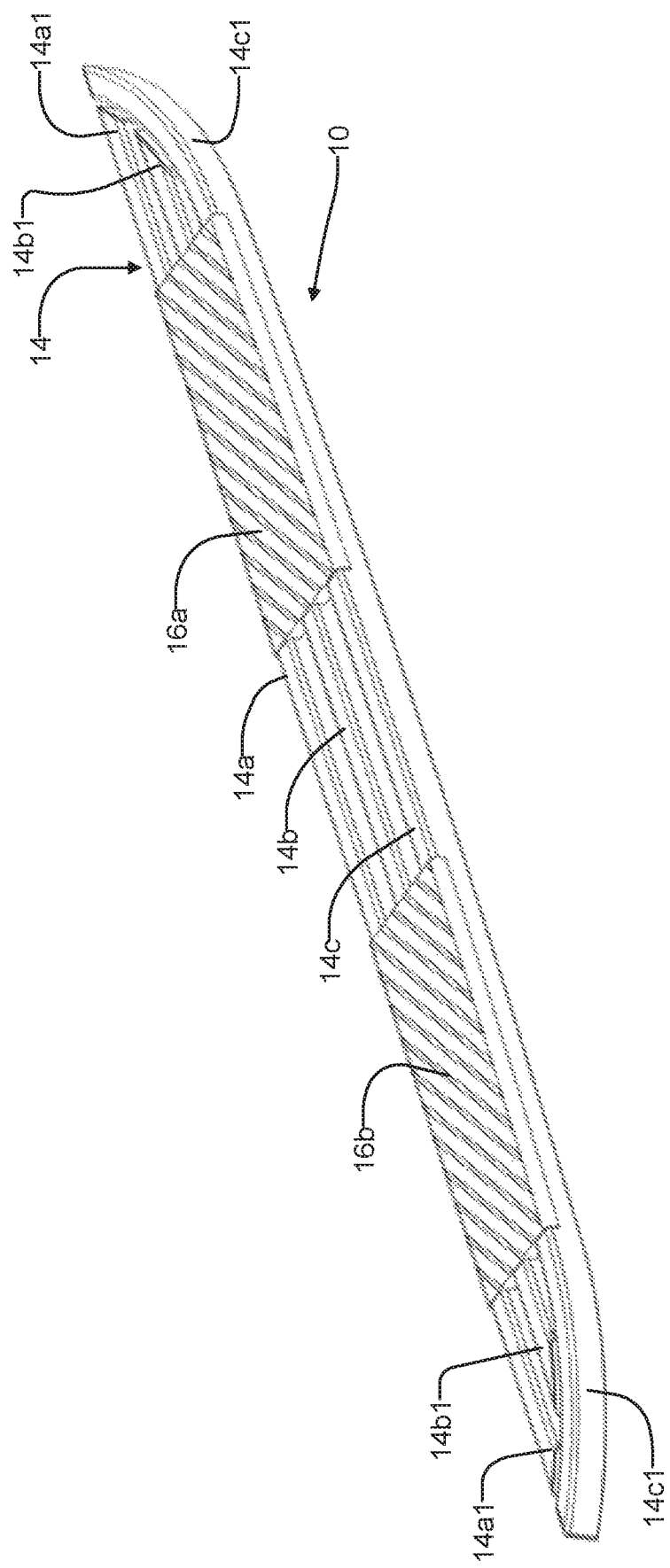
FIG. 2 is an enlarged perspective view of the step rail system of FIG. 1 wherein the step rail elements have curved leading and trailing ends.

Referring to FIG. 2, the step rail system 10 is shown in enlarged fashion. The step rail system 10 may include two, three, four or more independent rail elements 14. In this example the system 10 makes use of three independent rail elements, that is an inner step rail element 14*a*, an intermediate step rail element 14*b* and an outermost step rail element 14*c*. Step pad sections 16*a* and 16*b* may be secured using external fastening elements (not shown), or possibly by suitable adhesives, or possibly even by an interference or friction fit between the rail elements 14*a*-14*c*. A single, enlarged step pad could also be used in place of the two step pad sections 16*a* and 16*b*.

Each rail element 14*a*-14*c* in this example forms a generally square or slightly rectangular shaped element when viewed in cross section, but other shapes (i.e., round, oval, etc.) could be used as well. In this example the rail elements 14*a* and 14*b* are formed as straight lengths of tubing, while the outermost rail element 14*c* is formed with curved end portions 14*c*1 (i.e., curved leading and trailing end portions), which wrap around the opposing ends of the inner rail element 14*a* and the intermediate step rail element 14*b*. To accommodate the curvature of curved end portions 14*c*1, the opposite outermost ends 14*a*1 of the rail elements 14*a* and the outermost ends 14*b*1 of the rail element 14*b* are cut, machined or otherwise formed to accommodate the curvature of the inside surface of the outermost rail element 14*c*. This enables the overall step rail system 10 to provide a highly aesthetically pleasing efficient appearance, as well as a highly aerodynamic configuration, without any significant gaps at the forward or rearward ends of the step rail system 10. The use of three independent rail sections 14*a*-14*c* also helps to enable draining of water from upper surfaces of the overall step rail system 10, as well as helping to reduce the weight of the step rail system 10. The step rail system 10 may be secured to a structural portion of the vehicle 12 by any style of suitable support brackets (not shown) well known in the art. The rail sections 14*a*-14*c* may be formed from any suitable metallic or plastic materials, however, it is expected that aluminum will be an especially preferable material due to its strength, light weight and resistance to the elements. The step pad sections 16*a* and 16*b* are preferably made from a rubber or elastomer type material which provides excellent grip and traction when standing on the step rail system 10, although other materials could be used as well, or a combination of metallic and non-metallic materials could be used.

Figure 3:
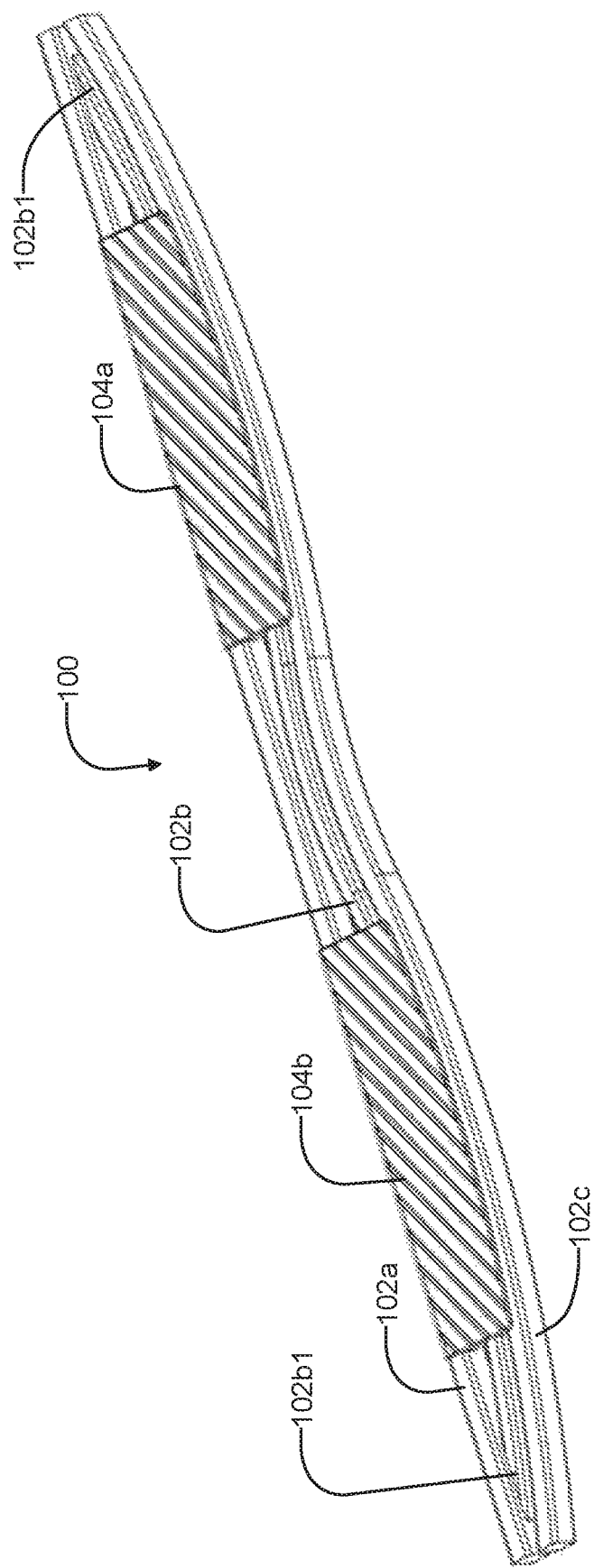
FIG. 3 is a perspective view of another step rail system in accordance with the present disclosure which makes use of step rail elements having a wave-like or undulating configuration over their full lengths.

FIG. 3 shows a step rail system 100 in accordance with another embodiment of the present disclosure. The step rail system 100 in this example includes a rail element 102*a* which is formed as a straight length of tubing, a rail element 102*b* having a wavy or undulating shape along its length, and a third rail element 102*c* shaped similar to the rail element 102*b* and supported nestably adjacent to the rail element 102*b*. Ends 102*b*1 of rail element 102 are cut, machined or otherwise formed to enable the ends to merge toward rail element 102*a* and enable the nesting positioning within rail elements 102*a* and 102*c*. While not shown in FIG. 3, suitable end caps may optionally be located at the ends of each of the rail elements 102*a*-102*c*. Step pad sections 104*a* and 104*b* may be attached in any suitable manner such as by threaded fasteners, adhesives or a friction fit to the rail elements 102*a*-102*c*. Again, the rail elements 102*a*-102*c* may be made from any suitable metallic or plastic materials, but it is expected that aluminum may be a preferred material. The step pad sections 104*a* and 104*b* may be made from an elastomer or rubber material, or a combination of these materials and a metallic material as a substrate on which the elastomer or rubber is mounted. The overall "wavy" or "undulating" shape of the step rail system 100 forms a highly aesthetic appearance, as well as a highly aerodynamic configuration, that complements the styling of a given vehicle on which the step rail system 100 is installed. The waviness also provides added surface width at those areas where an individual would typically step on when entering or exiting the vehicle 12.

Figure 4:
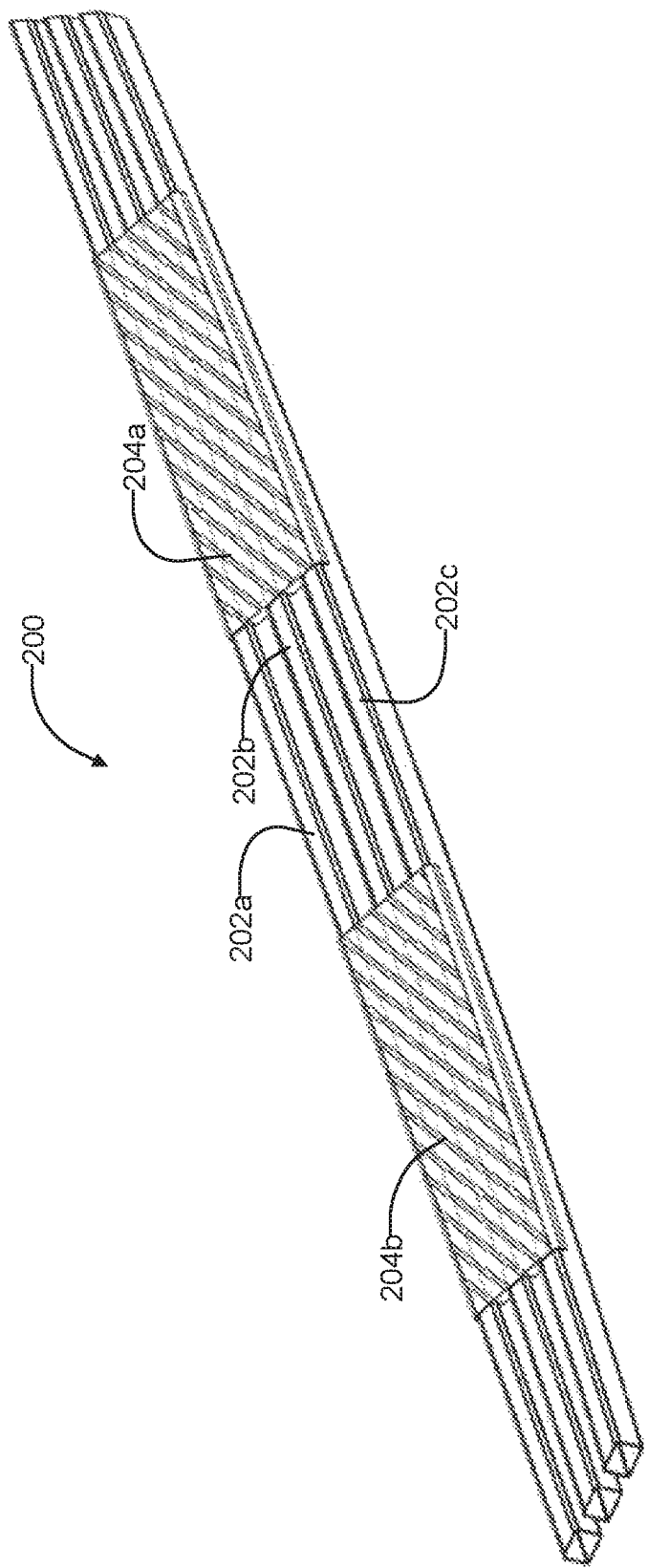
FIG. 4 is a perspective view of another step rail system which shows the step rail elements thereof each having a straight configuration and being of identical construction.

FIG. 4 shows a step rail system 200 in accordance with another embodiment of the present disclosure. The step rail system 200 in this example includes three identically formed, straight step rail elements 202*a*-202*c* that are secured closely adjacent one another. In this example the step rail elements 202*a*-202*c* are formed with a square cross-sectional shape, although any cross sectional shape could be used (e.g., round, rectangular, oval, oblong, etc.). Step pad sections 204*a* and 204*b* may be secured to the step rail elements 202*a*-202*c*. End caps (not shown) may also be secured to the opposite ends of each step rail element 202*a*-202*c*. The step rail elements 202*a*-202*c* may be made from any metallic or suitably strong plastic material, but again it is expected that aluminum will be a particularly preferred material. The step pad sections 204*a* and 204*b* may be made from any suitable elastomer, rubber or even metallic material.

Figure 5:
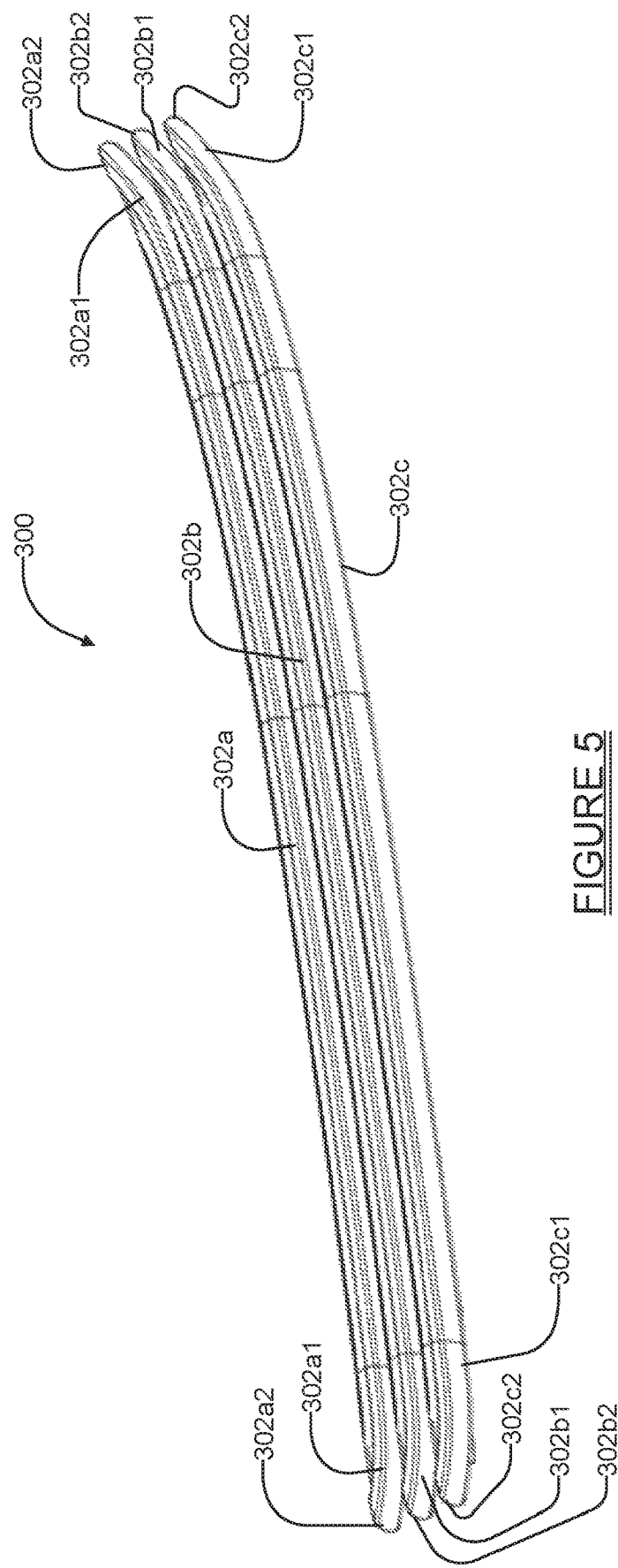
FIG. 5 is a perspective view of another step rail system of the present disclosure in which each of the step rail elements are identical in construction, and wherein each has a curved leading and trailing end and the step rail elements are secured in a nested arrangement.

FIG. 5 shows a step rail system 300 in accordance with yet another embodiment of the present disclosure. Step rail system 300 in this example includes three identical step rail elements 302*a*-302*c* each having a slightly curved configuration, for example formed by a well-known stretch/bent forming process, along a majority of their lengths, with more pronounced curvatures at their leading edges and trailing edges 302*a*1, 302*b*1 and 302*c*1. Optionally, one or more step pads may be included with the system 300 as well. Ends 302*a*2, 302*b*2 and 302*c*2 are cut, machined or otherwise formed such that they form surfaces that are generally parallel to the side of the vehicle 12 body, and thus end portions of each is essentially hidden from view when the step rail system 300 is assembled onto the vehicle. Nevertheless, end caps (not shown) may also be assembled into the ends 302*a*2, 302*b*2 and 302*c*2 to close off the ends. And while the step rail elements 302*a*-302*c* are shown with a generally square cross-sectional configuration, it will be appreciated that virtually any cross-sectional shape (e.g., rectangular, round, oval, oblong, etc.) could be used for the step rail elements 302*a*-302*c*.

Referring to FIG. 4, another step rail system 400 is shown in accordance with another embodiment of the present disclosure. The step rail system 400 in this example includes a straight inner rail element 402, a straight intermediate rail element 404 and a complexly shaped outer rail element 406. The rail elements 402-406 in this example are generally square shaped in cross section, although they need not be. The cross-sectional shape may be rectangular, round, oval, circular, or virtually other cross sectional shape, and the step rail system 400 is not limited to the use of rail elements of any specific cross sectional shape. In addition, while three step rail elements 402-406 are shown, the system 400 could be modified to include greater or less than three such elements.

The step rails elements 402-406 may be formed through any suitable manufacturing technique, for exampling injection molding or extrusion molding, or by a stretch/bent molding technique. Aluminum is a particularly desirable material for forming the rail system 400, although other materials such as stainless steel and even high strength plastics may potentially be used. The step rail elements 402-404 may be secured at their opposing ends to inwardly facing wall portions of the complexly shaped outer rail element 406 through the use of threaded fastening elements, or otherwise brazed to the outer rail element 406, or possible even secured by suitably strong adhesives, or a combination of such securing implements and engagement with cutout sections on the inner wall surface of the outer rail element 406.

The complexly shaped outer rail 406 is unique in that it is formed to slope outwardly (in the horizontal plane) away from the inner rail 402 and the intermediate rail 404, and also to provide curving front and rear sections 406a and 406b, respectively, as well as elevationally angled sections 406d, planar step portions 406e and a central portion 406f. The elevationally angled sections 406d help to provide a distinct "step" look to the outermost rail element 406, as well as to define two distinct step areas where an individual may step to enter a vehicle. The elevationally angled step sections 406d also help to provide surfaces which may help prevent an individual's foot from slipping laterally (forwardly or rearwardly) along the outer rail 406 in the event the individual is leaning forwardly or rearwardly, relative to the length of the vehicle, while entering or exiting the vehicle. The curving front and rear sections 406a and 406b of the complexly shaped outer rail 406 help to provide excellent aerodynamic qualities that minimize wind drag by the system 400.

Figure 6:
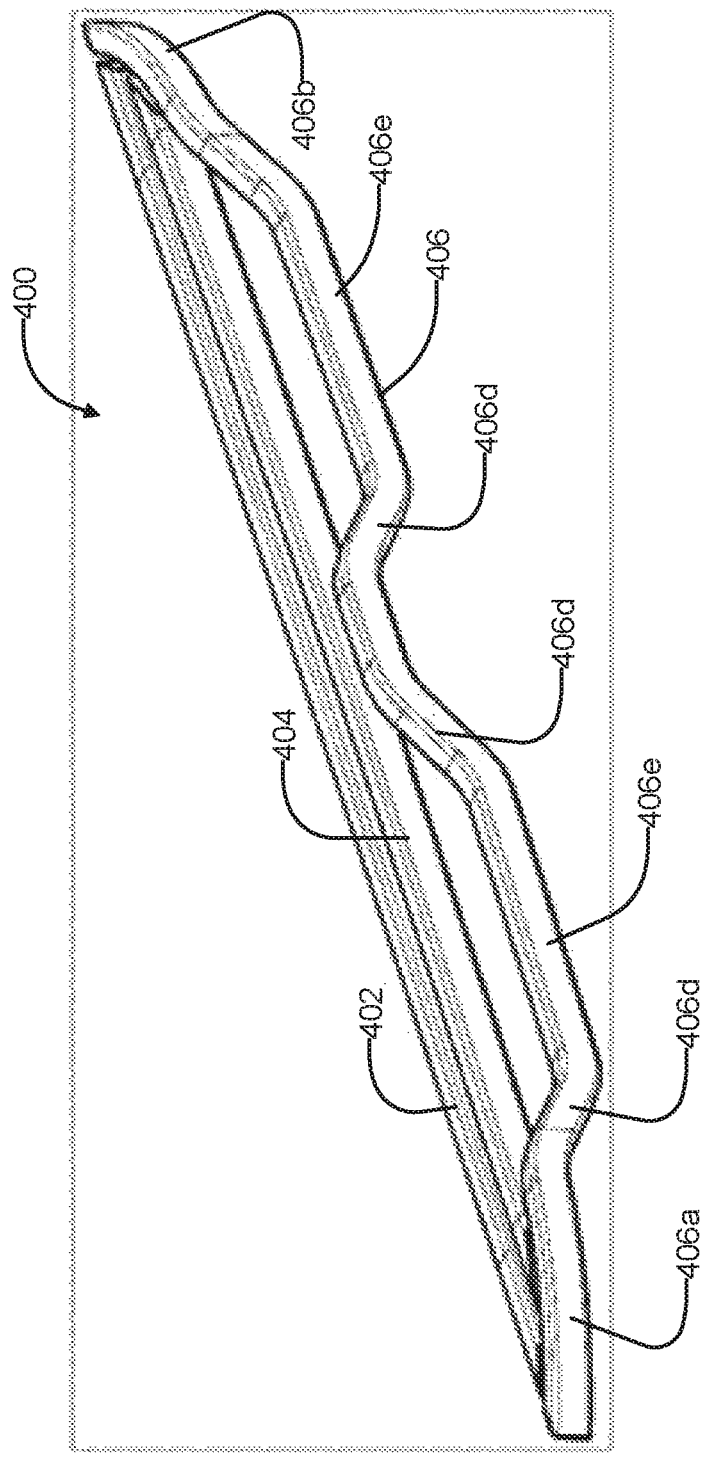
FIG. 6 is a perspective view of another step rail system of the present disclosure in which the outermost step rail element includes angled portions that form a pair of planar step portions.

Optionally, while not shown in FIG. 6, rubber or elastomer elements pads or pad-like elements may be secured (either by conventional fasteners or adhesives) to upwardly facing surfaces of the planar step portions 406e to provide an even further improved gripping surface when stepping onto the planar step portions.

For each of the various step rail systems 10, 100, 200, 300 and 400, the step rail elements 14a-14c, 100a-100c; 200a-200c and 300a-300c; and 402-406 may be fully exposed or partially exposed constant cross section dimension structural members. This significantly simplifies manufacturing because each of the step rail elements 14a-14c, 100a-100c, 200a-200c, 300a-300c, and 402-406 may be made using the same tooling, for example by extrusion or possibly even by a roll forming technique, or by a stretch/bent forming process. It will be appreciated that these constant cross section dimension structural members can be made of any rigid material. In the example shown the step rail elements 14a-14c, 100a-100c, 200a-200c, 300a-300c and 402-406 are each positioned closely adjacent one another and in a nested fashion, such that each group of elements produces a suitable stepping surface or a suitable surface to attach a step pad to, which further increases the safety or aesthetics of the step rail system. Each of the step rail systems 100, 200, 300 and 400 may be secured in the conventional fashion using a pair of spaced apart, suitable supports (typically L-shaped metallic elements), that may be coupled to the structural portion of the vehicle. Accordingly, the systems 100-400 do not require using complex mounting hardware to support them from the vehicle.

While the various embodiments shown use constant dimension cross sectional shapes, multiple constant section profiles can be positioned adjacent to one another; thus, step rail elements having different cross sectional dimensions could employed in each of the step rail systems 10, 100, 200 or 300. Any or all of the step rail elements may also be bent or formed in two or three dimensions to improve the appearance or functionality of the assist step. The use of angled or curved cuts at the ends of one or multiple ones of the step rail elements may be utilized for the same purposes.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A step rail system supportable from a structure of a motor vehicle, the system comprising:
    an inner step rail element;
    an outermost step rail element arranged nestably with the inner step rail element, the inner and outermost step rail elements being arranged at least partially within the same plane;
    the outermost step rail element having at least one of a curved leading end portion or a curved trailing end portion; and
    further including at least one step pad section that covers portions of both of the inner and outermost step rail elements.

2. The step rail system of claim 1, wherein the outermost step rail element includes both a curved leading end portion and a curved trailing end portion.

3. The step rail system of claim 2, wherein the curved leading and trailing end portions of the outermost step rail element cover end portions of each of the inner and intermediate step rail elements.

4. The step rail system of claim 3, wherein the inner step rail element, the outer step rail element and the intermediate step rail element are arranged in a common elevational plane to form a generally flat surface.

5. The step rail system of claim 1, further comprising an intermediate step rail element positioned between the inner step rail element and the outermost step rail element.

6. The step rail system of claim 5, wherein the outermost step rail element includes leading and trailing end portions that extend over end portions of the inner step rail element.

7. The step rail system of claim 5, wherein the intermediate step rail element includes at least one of a curved leading end portion or a curved trailing end portion.

8. The step rail system of claim 5, wherein the inner step rail element, the outermost step rail element and the intermediate step rail element each include curved leading and trailing end portions.

9. The step rail system of claim 1, further including a pair of step pad sections that cover spaced apart portions of both of the inner and outermost step rail elements.

10. The step rail system of claim 1, wherein the inner step rail element includes at least one of a curved leading end portion or a curved trailing end portion.

11. The step rail system of claim 1, wherein the outermost step rail element comprises a complexly shaped outer step rail element having elevationally angled sections that define two planar step portions.

12. A step rail system supportable from a structure of a motor vehicle, the system comprising:
    an inner step rail element;
    a tubular, outermost step rail element;
    the inner step rail element being shaped to be arranged nestably with the tubular, outermost step rail element in a non-overlapping arrangement;

the inner step rail element and the tubular, outermost step rail element being arranged at least partially within the same plane; and the tubular, outermost step rail element having a smoothly, gradually curving leading end portion and a smoothly, gradually curving trailing end portion, and being formed from a single length of tubular material.

13. The system of claim 12, wherein the inner step rail element comprises a straight step rail element.

14. The system of claim 12, further comprising an intermediate step rail element positioned to nest between the inner step rail element and the outermost step rail element, and wherein the curved leading and trailing end portions of the outermost step rail element covers opposing end portions of the inner and intermediate step rail elements.

15. A step rail system supportable from a structure of a motor vehicle, the system comprising:

an inner step rail element;

an intermediate step rail element;

an outermost step rail element;

the inner step rail element and the intermediate step rail element being arranged nestably with the outermost step rail element and in a non-overlapping manner;

the inner step rail element, the intermediate step rail element and the outermost step rail elements being arranged at least partially within the same plane and each being of tubular construction, and with the outermost step rail element including gradually curving leading and trailing end portions, and each being formed from a single length of material.

16. The step rail system of claim 15, wherein the curved leading and trailing end portions wrap around end portions of the inner and intermediate step rail elements.

17. The step rail system of claim 15, further including a pair of step pads secured over upper surface portions of the inner rail element, the intermediate rail element, and the outermost step rail element.

* * * * *